United States Patent [19]
Ellersick et al.

[11] Patent Number: 5,402,479
[45] Date of Patent: Mar. 28, 1995

[54] METHOD AND APPARATUS FOR TRANSLATING SIGNALING INFORMATION

[75] Inventors: William F. Ellersick, Redwood City; Steven P. Saneski, Cupertino, both of Calif.

[73] Assignee: Raynet Corporation, Menlo Park, Calif.

[21] Appl. No.: 147,905

[22] Filed: Nov. 2, 1993

Related U.S. Application Data

[63] Continuation of Ser. No. 41,925, Apr. 2, 1993, abandoned, which is a continuation of Ser. No. 697,855, May 9, 1991, abandoned.

[51] Int. Cl.$^6$ .......................... H04M 7/00; H04J 3/12
[52] U.S. Cl. .................................... 379/237; 379/229; 379/230; 379/290; 370/110.1
[58] Field of Search ............... 379/237, 230, 236, 229, 379/290; 370/68.1, 79, 110.1

[56] References Cited

U.S. PATENT DOCUMENTS 4,059,731  11/1977  Green et al. ........................ 370/13
4,928,276  5/1990   Blondeau, Jr. et al. ......... 370/110.1
5,119,415  1/1992   Aoyama ............................. 379/230

OTHER PUBLICATIONS

Proceedings IEEE International Conference on Communications, vol. 2, 22 Jun. 1986, Toronto (Canada), pp. 1105-1110; Billhardt et al., "A survey of the remote switching capabilities of the 5ESS switch"(Y).
Conference Proceedings Wescanex 88, 11 May 1988, Saskatchewan (Canada) pp. 101-107, Hara, "A fiber optic network design for intelligent buildings".
Mischa Schwartz, Telecommunication Networks=-Protocols, Modeling and Analysis, Addison-Wesley Publishing Company, pp. 534-539.

Primary Examiner—James L. Dwyer
Assistant Examiner—Fan Tsang
Attorney, Agent, or Firm—Herbert G. Burkard

[57] ABSTRACT

An office interface unit (OIU) transfers data and signaling between a telephone local exchange and distribution lines. Information from the telephone local exchange is contained in repetitive frames containing signaling time slots which each contain two distinct nibbles of information. The OIU translates each local exchange signaling channel into first and second internal signaling channels, each internal signaling channel containing information representative of one signaling nibble therein. This simplifies DSO time slot interchange in the OIU. In addition, each internal signaling channel is provided with at least one additional significant signaling bit thereby providing additional signaling states so that the OIU equipment can account for multiple types of telephone local exchange equipment easily. Furthermore, each internal signaling channel is also provided with at least one data coding check bit thereby providing an easy and efficient method of determining whether or not bit errors are occurring in the OIU or equipment connected thereto.

20 Claims, 2 Drawing Sheets

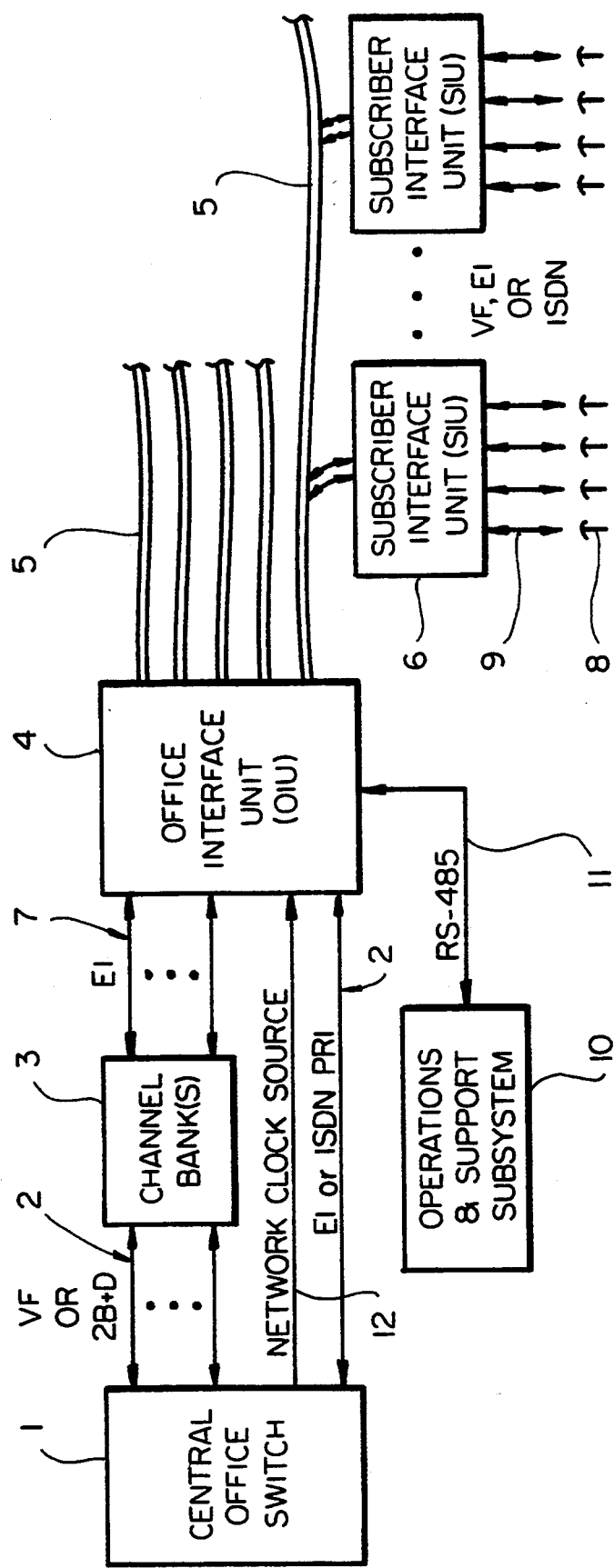
FIG_1

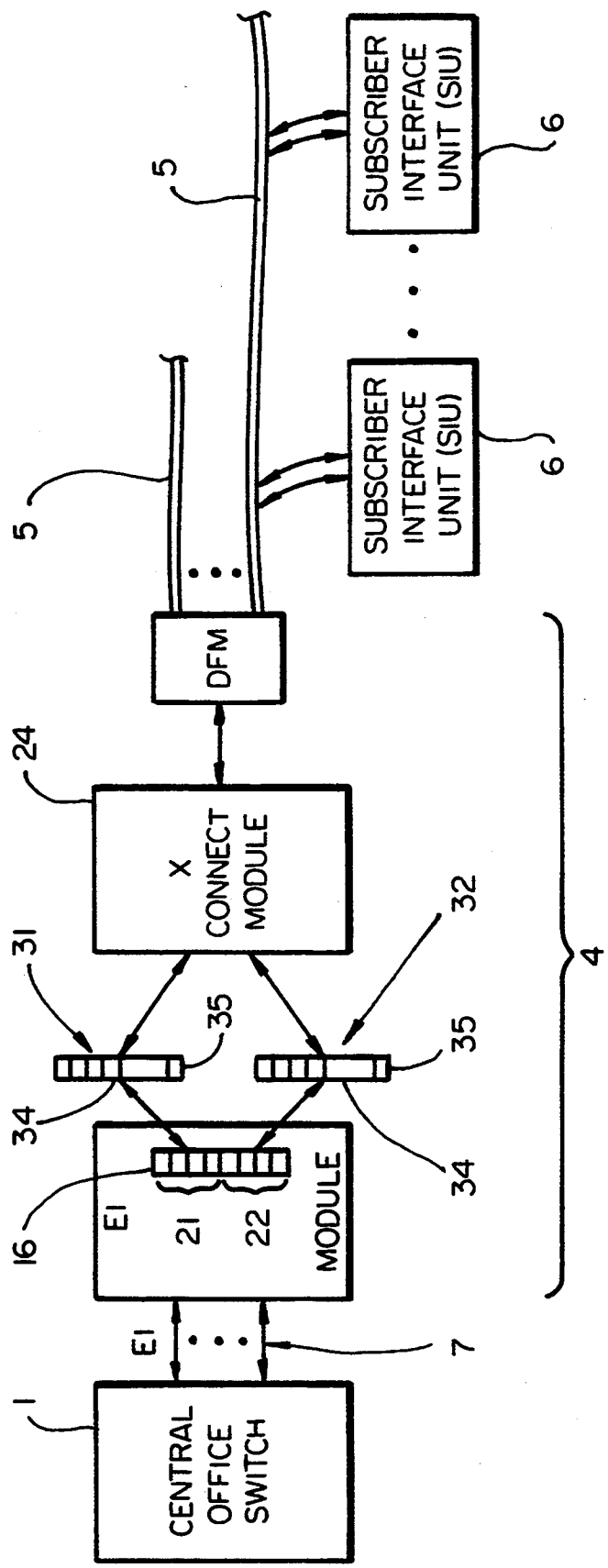
FIG_2

METHOD AND APPARATUS FOR TRANSLATING SIGNALING INFORMATION

This is a continuation of application Ser. No. 08/041,925, filed on Apr. 2, 1993, now abandoned, which is a file wrapper continuation of application Ser. No. 07/697,855, filed May 9, 1991, now abandoned.

FIELD OF THE INVENTION

The present invention relates to an apparatus and method for transferring data and signaling information between a telephone local exchange and distribution lines, and in particular to an improvement in translating signaling information therebetween.

BACKGROUND OF THE INVENTION

Telecommunication transmission systems include both data and signaling channels arranged in repetitive frames whereby the signaling channels contain signaling information for the data channels. Over multiple frames, signaling information for all data channels is transmitted. According to at least one international transmission standard referred to as an E1 format which conforms to specifications set forth in CCITT draft recommendations G.703, G.704 and G.732, transmission frames consist of 32 channels, generally denoted as DSOs, each DSO containing 8 bits, and each 8 bits being referred to as a byte. Each frame contains a framing channel followed by 15 data channels followed by a signaling channel followed by a further group of 15 data channels. The signaling channel contains two groups of "ABCD" bits of information, and each group is referred to as a "nibble" herein, each nibble having 16 possible states for indicating signaling states for the data channels. The first ABCD nibble in the signaling channel indicates a signaling state for the first group of 15 data channels, with the second nibble representing 16 possible signaling states for the second group of 15 data channels within the frame, the two nibbles forming a signaling byte.

A problem exists in conveniently cross connecting the data and signaling channels contained in the local exchange frames between the telephone local exchange equipment and the distribution lines since the signaling information nibble associated with the first set of 15 data channels of a particular frame is located in the same channel as the signaling information nibble associated with the second set of 15 data channels of the same frame. Specifically, when reading out the DSO channel information into a cross connect memory using cross connect information in another memory, each frame has to be read out twice so that both nibbles can be appropriately accessed and addressed to an appropriate memory location. This requires that cross connect speed be doubled or that memory access speed be doubled over that which is otherwise necessary for reading into memory the data channels. In addition, means need to be provided for not disturbing an existing nibble in a signal memory when an additional signal nibble is being added to its DSO slot. Addressing these concerns complicates cross connect hardware and software in both a downstream and upstream transmission direction.

SUMMARY OF THE INVENTION WITH OBJECTS

It is an object of the invention to provide an improved means and method for transferring data and signaling information between a telephone local exchange and distribution lines which obviates the disadvantages referred to above when at least two nibbles of signaling information are contained in a single channel in each transmission frame.

It is a further object of the invention to translate a local exchange signaling channel containing two nibbles of signaling information therein into at least first and second internal signaling channels having a size approximately the same as office interface unit (OIU)-subscriber interface unit (SIU) data channels. The OIU transfers the data and signaling information between the local exchange and the SIUs and its associated distribution lines.

It is a further object of the invention to provide within the first and second internal signaling channels additional significant bits for accomplishing further tasks with little additional software or hardware overhead complexity. One significant bit preferably comprises a data or coding checking means. According to a preferred embodiment, the coding check bit comprises a parity check bit whereby each internal signaling channel is provisioned to have only one of an odd or even number of bits therein when operating normally so that if the designated odd or even number of bits is not detected a coding or parity error is indicated. Since the internal signaling bits channels are subjected to many of the same operations as data channels, any time a common OIU or SIU failure such as when a stuck bit in a register occurs, errors caused in the data thereby will be detectable by the OIU or SIU since the signaling channels will indicate parity failures.

According to one preferred embodiment, any time a signaling parity error is found, the contents of the internal signaling channel containing the parity error is not read into memory but rather the "old" contents of the signaling memory are retained for the particular signal in question in both the OIU and the SIU. This prevents erroneous signaling information from being entered into memory in the OIU and/or SIU.

Another preferred additional significant bit which may be utilized in the internal signaling channels an additional signaling bit. The use of an additional signaling bit allows the OIU-SIUs to have twice as many signaling states as that provided by the telephone local exchange. The additional signaling states are particularly advantageous when the OIU is required to communicate with numerous types of telephone local exchange equipment, such as numerous kinds of switches, multiplexers, etc. since much of this equipment is manufactured according to different protocols and interfaces and, when any two differing pieces of equipment each have N different signaling states, if information from both of the pieces of equipment need to be cross connected within a common unit such as an OIU, the total number of possible desired signaling states oftentimes is greater than N. According to a preferred embodiment, the telephone local exchange provides ABCD signaling bits, and the OIU translates this signaling channel into ABCDE signaling thereby increasing the number of possible signaling states from 16 to 32.

According to a preferred embodiment, all local exchange data channels and all OIU-SIU data channels have 8 bits therein, as well as each internal signaling channel, with each internal signaling channel containing an "E" signaling bit and a data coding check bit and two unused bits. Eight bit channel allows for use of commonly available hardware, e.g. processors, memories, FIFOs, octal registers, etc.

These and other objects of the invention are achieved by providing an office interface unit (OIU) for transferring data and signaling information between a telephone local exchange and distribution lines, the local exchange transmitting and receiving the data and signaling information in a plurality of channels contained in repetitive local exchange frames, each frame comprising a local exchange signaling channel containing at least first and second local exchange signaling nibbles associated with first and second groups of local exchange data channels respectively, comprising:
- a translation module capable of translating the local exchange signaling channel into at least first and second internal signaling channels, the first internal signaling channel receiving the information contained in the first signaling nibble, the second internal signaling channel receiving the information contained in the second signaling nibble, the first internal signaling channel being associated with the first group of local exchange data channels and the second internal signaling channel being associated with the second group of local exchange data channels;
- for transmission from the OIU to the local exchange, means for translating the first and second internal signaling channels into the local exchange signaling channel.

Further objects achieved by the invention are achieved by providing an information distribution system, comprising:
- at least one optical fiber;
- at least one subscriber interface unit (SIU); at least one office interface unit (OIU), the optical fiber interconnecting the SIU and OIU, the OIU being connected to a local exchange, the local exchange transmitting and receiving data and signaling information in a plurality of channels contained in repetitive local exchange frames, each frame comprising a local exchange signaling channel containing at least first and second local exchange signaling nibbles associated with first and second groups of local exchange data channels respectively, the OIU comprising:
- a translation module capable of means for translating the local exchange signaling channel into at least first and second internal signaling channels, the first internal signaling channel receiving the information contained in the first signaling nibble, the second internal signaling channel receiving the information contained in the second signaling nibble, the first internal signaling channel being associated with the first group of local exchange data channels and the second OIU signaling channel being associated with the second group of local exchange data channels;
- for transmission from the OIU to the local exchange, means for translating the first and second internal signaling channels into the local exchange signaling channel.

Yet further objects achieved by the invention are achieved by a method for transferring data and signaling information between a telephone local exchange and distribution lines, the local exchange transmitting and receiving the data and signaling information in a plurality of channels contained in repetitive local exchange frames, each frame comprising a local exchange signaling channel containing at least first and second local exchange signaling nibbles associated with first and second groups of local exchange data channels respectively, comprising the steps of:
- a translation module capable of translating the local exchange signaling channel into at least first and second internal signaling channels, the first internal signaling channel receiving the information contained in the first signaling nibble, the second internal signaling channel receiving the information contained in the second signaling nibble, the first internal signaling channel being associated with the first group of local exchange data channels and the second internal signaling channel being associated with the second group of local exchange data channels;
- for transmission from the OIU to the local exchange, translating the first and second internal signaling channels into the local exchange signaling channel.

These and other objects of the invention will be further explained by reference to the following drawings and detailed description.

BRIEF DESCRIPTION OF THE DRAWINGS

FIG. 1 is a block diagram illustrating one preferred distribution architecture according to the invention;

FIG. 2 illustrates several different modules of an office interface unit illustrated in FIG. 1.

DESCRIPTION OF THE PREFERRED EMBODIMENTS

The present invention relates to an improved telephone or data distribution system, and in particular to an improved OIU for transferring data and signaling between a local exchange, preferably a telephone local exchange, and distribution lines, the distribution lines preferably being optical fibers. The optical fibers can be arranged so as to provide point-to-point connections between the OIU and individual subscribers, or can be arranged such that the fiber is terminated at a subscriber interface unit (SIU) generally located close to a group of subscribers, with each of the subscribers within a group then connected to the SIU, either via electrical wire or further optical fibers.

According to preferred embodiments, each SIU is located at a street curb and is connected to any desired number of subscribers, in particular to as few as one to as many as 60. The SIUs can be connected to the OIU individually in a point-to-point star arrangement, or can be all connected to a single optical fiber with information contained therein being in a bus format, preferably time multiplexed. According to preferred embodiments, upstream writing by the SIUs toward the OIU is done in an asynchronous format to minimize and preferably eliminate the chance of collisions between packets of information of various SIUs when a logical bus format is used. A preferred protocol for upstream transmission comprise several overhead bytes of information at the beginning of a frame such as a clock acquisition dark byte, a clock acquisition training byte, a preamble byte, and a start of packet delimiting byte, as more fully explained in US patent application Ser. Nos. 07/677,707 now U.S. Pat. No. 5,208,693, issued May 4, 1993, and 07/677,044, both filed Mar. 29, 1991, assigned to the assignee of the invention, the disclosures of which are incorporated herein by reference. While an SIU can be connected to only a single subscriber, increasing the number of subscribers connected to each SIU increases the efficiency of the distribution network since the frame overhead bytes are spread over more payload (e.g. data channels). Preferably downstream transmissions to the SIUs are synchronous. The invention is compatible with any of the foregoing and other distribution architectures, topologies, and protocols.

The OIU's primary function is to transfer data and signaling information between the local exchange equipment and the distribution optical fiber(s) going to the SIU(s), to receive operations and maintenance commands from upstream operational support system software in the logical direction of the local exchange, to report events to the operational support software, to perform routine system integrity monitoring and redundancy switching, to coordinate operation and maintenance of the SIUs, and to control visual status indicators and alarms.

Preferably, non-blocking time slot interchange at the DS0 level is performed in the OIU. This allows the distribution system to be configured from a keyboard at an operations and support subsystem (OSS), and to be engineered into existing telephone networks without knowledge of the distribution optical architecture. Any office feeder channel 2, 7 may be connected to any SIU channel. Time slot interchange also allows subscriber channels to be groomed to specific office feeders, which is important for support of several different kinds of services. According to a preferred embodiment, an OIU bus is run at a speed in excess of 5 megahertz, giving a capacity of 640 time slots, or nominally 512 DS0s plus 120 ABCD signaling bytes with 8 spares. The OIU provides the signaling cross connect between the SIUs and E1 feeders to the exchange or channel bank for voice frequency services. Some services, including E1 synchronous and ISDN basic and primary rate, are passed through the system as groups of clear channel DS0s, and do not undergo the signaling processing described herein. The OIU translates ABCD signaling on a per E1 basis to allow support of channel banks from multiple vendors and an upgrade path to direct digital switch interfaces.

FIG. 1 illustrates one preferred embodiment of the invention whereby signaling and data information is transmitted between a telephone local exchange 1, such as a central office switch, and an OIU 4. The central office switch 1 oftentimes communicates with a remote extension thereof, e.g. a channel bank 3, which then in rum communicates with the OIU 4. The information transmitted can either be voice frequency (VF) information such as telephone signals, or integrated services digital network information (ISDN), denoted as 2B+D, which information normally occupies three 8 bit DS0 data channels.

As can be seen in FIG. 1, either or both of the central office switch 1 and channel bank 3 transmit information to the OIU synchronously in what is known as an E1 transmission format whereby the information is contained within repetitive frames having 32 channels, a first channel comprising a framing channel, the following 15 channels comprising a first group of data channels, the next channel comprising a signaling channel having two 4 bit nibbles, with the remaining 15 channels comprising a second group of data channels. Each signaling nibble is associated with one of the two groups of data channels within each frame. The OIU is also connected via a communication link 11 with an operations support system (OSS) 10. One or more pairs of distribution optical fibers 5 interconnect the OIU and one or more subscriber interface units (SIUs) which in turn are connected to multiple subscribers, denoted as telephone symbols 8 in FIG. 1. Lines 9 interconnecting the subscribers 8 and the SIUs can be either optical or electrical, as desired. When the lines 9 are electrical, it is preferred that their length be no longer than 650 feet. Optical fiber 5 can be any desired length, though preferably kept to a length which results in a round trip propagation delay of less than one frame so time-of-flight corrections can easily be made, e.g. less than 10 km. Preferably, the OIU transmits synchronously, deriving reference clocks from a network reference clock illustrated in FIG. 1 by signal line 12 or an internal clock (not shown).

Since each local exchange E1 frame contains a signaling channel having two signaling nibbles therein, when reading the data and signaling into memory for cross connecting, without the aid of the present invention, it is necessary to run the memory at a speed twice as fast as otherwise required for simply reading each data channel, with the additional complexity that any time a signaling nibble is added to a signaling channel already containing a nibble therein that the preexisting nibble not be disturbed.

According to the invention, by reference to FIG. 2, local exchange frames 7 are read by an E1 translation module within the OIU 4. Each local exchange signaling channel 16, which each contains first and second signaling nibbles 21, 22, each signaling nibble preferably containing 4 bits, e.g. ABCD bits, is translated by the E1 translation module into first and second internal signaling channels 31, 32, respectively. These internal signaling channels are then read into a cross connect module 24 which cross connects local exchange data channels, which can also be referred to as OIU data channels, along with their corresponding internal signaling channels, using conventional control stores, memories, processors, etc. Thereafter, the cross connected signaling information and data is transferred to a distribution fiber module (DFM) which arranges the data channels and internal signaling channels into repetitive OIU frames for transmission on distribution optical fibers 5 to one or more distribution SIUs 6. Any one of a variety of optional OIU frame protocols can be utilized, synchronous transmission being preferred in the downstream direction.

According to the E1 frame protocol, the signaling nibbles each comprise four ABCD bits which indicate a maximum number of 16 possible states. Each nibble is translated by the E1 translation module into a corresponding internal signaling channel preferably 8 bits in length. Also each OIU data channel comprises 8 bits so conventional memories and processors can be utilized in the OIU. According to the invention, an expansion "E" signaling bit 34 is inserted into each internal signaling channel by the E1 module thereby increasing the possible number of signaling states from 16 to 32. This aspect of the invention allows the internal signaling information to account for different interface standards which exist for different manufacturers' equipment at the local exchange. Accordingly, the OIU can distinguish between a variety of equipment interfaces and accurately denote the desired signaling state using the internal signaling channel. Any desired internal signaling format can be used for the ABCDE bit configuration.

A further feature of the invention is the provision by the E1 translation module of at least one additional significant bit 35 within the internal signaling channels 31, 32, the additional significant bit being a data coding check bit 35. The check bit is utilized to give the OIU (and SIU if desired) the ability to determine if common errors are occurring in either the OIU equipment or SIU equipment. Specifically, the data coding check bit 35 is utilized so that for a "normal" signal the number of binary "1's" corresponds to only an even number or odd number as desired. Assuming that the data coding check set up is such that normal operation is indicated by an odd number of 1's, any time the OIU detects an even number of 1's in an internal signaling channel a parity error is indicated. In this event, rather than reading the erroneous signaling data into OIU and SIU memory to replace previous signaling information stored therein, e.g. the prior signaling information for the appropriate data channel(s), the erroneous signaling information is discarded and a notation in OIU memory is made of the occurrence of the signaling error. Upon the occurrence of a predetermined number of signaling errors being detected within a predetermined amount of frames or time, the OIU can initiate self diagnostic tests in an attempt to try and isolate and locate the cause of the error, and simultaneously also alert the OSS 10 so that appropriate alarms can be generated, and additional diagnostics implemented and directed by the OSS 10, if necessary. Since internal signaling channels are processed in series with OIU data channels, with multiple sets of data and internal signaling channels being processed in parallel within the OIU, a common hardware or software fault, such as a stuck register bit, which inevitably corrupts data, will similarly corrupt an associated internal signaling channel, and thus the addition of the parity bit to the internal signaling channel allows an efficient, convenient, and relatively inexpensive means of monitoring system integrity and performance and tracing down system faults.

According to a preferred embodiment, ABCDE all zeros is used to indicate downstream signaling framing, downstream being towards the direction of the SIUs from the OIU, ABCDE all zeros being an otherwise improper signaling state. Preferably upstream signaling framing is synchronized to downstream signaling framing and is not required to be sent upstream by the SIUs.

Since according to the invention E1 frame signaling nibbles are individually translated into internal signaling channels which occupy individual DS0 time slots in the OIU, with the addition of a coding check bit and an additional signaling bit in each internal signaling channel, DS0 cross connect efficiency is improved with the additional advantages of now being able to distinguish between different types of local exchange equipment due to the additional signaling states in each internal signaling channel. Also, the coding check bit provides an easy and convenient method for detecting transmission errors.

Though the invention has been described by reference to a fiber-to-the-curb system whereby subscribers are connected to SIUs, as previously indicated the invention is not dependent on any particular distribution architecture or topology, e.g. bus, star, PON (passive optical network), etc. Also, the invention, described by reference to an E1 transmission format, is not to be limited to only this format and applies to any framing format which combines a plurality of signaling nibbles into any one signaling channel. Accordingly, the invention is not to be limited by reference to any particular preferred embodiment described, rather it should only be limited by the appended claims.

What is claimed is:

1. An office interface unit for transferring data and signaling information between a telephone local exchange and distribution lines, the local exchange transmitting and receiving the data and signaling information in a protocol which includes a plurality of channels contained in repetitive local exchange frames, each frame containing first and second groups of data channels and a local exchange signaling channel, the local exchange signaling channel containing at least first and second local exchange signaling nibbles associated with the first and second groups of data channels, respectively, comprising:

a translation module capable of translating the information contained in the local exchange signaling channel into at least first and second internal signaling channels, wherein the first internal signaling channel receives the information contained in the first local exchange signaling nibble, and the second internal signaling channel receives the information contained in the second local exchange signaling nibble.

2. The office interface unit of claim 1, wherein each of the first and second internal signaling channels are capable of storing a greater mount of information than are each of the first and second local exchange signaling nibbles, respectively.

3. The office interface unit of claim 2, wherein each internal signaling channel has a greater number of bits than its associated local exchange signaling nibble.

4. The office interface unit of claim 3, wherein each internal signaling channel has at least twice as many possible signaling states as its associated local exchange signaling nibble.

5. The office interface unit of claim 3, wherein the greater number of bits are used for fault detection.

6. The office interface unit of claim 5, wherein each of the first and second internal signaling channels in normal operation will have a state consisting of only one of an odd or even number of binary 1's and when the state of either of the internal signaling channels is not either an odd or even number of binary 1's, respectively, a fault condition is indicated.

7. The office interface unit of claim 4, wherein the greater number of bits are used for fault detection.

8. The office interface unit of claim 7, wherein each of the first and second internal signaling channels in normal operation will have a state consisting of only one of an odd or even number of binary 1's and when the state of either of the internal signaling channels is not either an odd or even number of binary 1's, respectively, a fault condition is indicated.

9. The office interface unit of claim 5, wherein prior contents of each internal signaling channel are maintained in memory when updated contents of that internal signaling channel are determined to contain a coding error.

10. The office interface unit of claim 1, wherein each local exchange signaling nibble consists of 4 bits, each internal signaling channel consists of 8 bits, and each data channel consists of 8 bits.

11. The office interface unit of claim 1, wherein the first and second internal signaling channels and the first and second groups of data channels are grouped into repetitive office interface unit frames for transmission between the office interface unit and the distribution lines.

12. An information distribution system, comprising:

an optical fiber;

a subscriber interface unit; and an office interface unit, the optical fiber interconnecting the subscriber interface unit and the office interface unit, wherein the office interface unit is connected to a local exchange, the local exchange transmitting and receiving data and signaling information in a protocol which includes plurality of channels contained in repetitive local exchange frames, each frame containing first and second groups of data channels and a local exchange signaling channel, the local exchange signaling channel containing at least first and second local exchange signaling nibbles associated with the first and second groups of data channels, respectively, the office interface unit comprising:

a translation module capable of translating the information contained in the local exchange signaling channel into at least first and second internal signaling channels, wherein the first internal signaling channel receives the information contained in the first local exchange signaling nibble, and the second internal signaling channel receives the information contained in the second local exchange signaling nibble.

13. The system of claim 12, the office interface unit further comprising a cross connect module capable of cross connecting individual data channels and their associated signaling information within the office interface unit.

14. The system of claim 13, wherein each internal signaling channel has a greater bit size than its associated local exchange signaling nibble.

15. A method for transferring data and signaling information between a telephone local exchange and distribution lines, the local exchange transmitting and receiving the data and signaling information in a protocol which includes a plurality of channels contained in repetitive local exchange frames, each frame containing first and second groups of data channels and a local exchange signaling channel, the local exchange signaling channel containing at least first and second local exchange signaling nibbles associated with the first and second groups of data channels, respectively, comprising the step of:

providing an office interface unit including a translation module capable of translating the information contained in the local exchange signaling channel into at least first and second internal signaling channels, the first internal signaling channel receiving the information contained in the first local exchange signaling nibble, and the second internal signaling channel receiving the information contained in the second local exchange signaling nibble.

16. The method of claim 15, further comprising the steps of:

sizing the internal signaling channels so that the bit size of each exceeds the bit size of its associated local exchange signaling nibble; and translating the local exchange signaling nibble into the respective internal signaling channels, each of the later having at least twice as many signaling states as each of the former.

17. The method of claim 16, further comprising the step of:

utilizing the greater bit size of each internal signaling channel for coding checking means.

18. An office interface unit for transferring data and signaling information between a telephone local exchange and distribution lines, the local exchange transmitting and receiving the data and signaling information in a protocol which includes a plurality of channels contained in repetitive local exchange frames, each frame containing first and second groups of data channels and a local exchange signaling channel, the local exchange signaling channel containing at least first and second local exchange signaling nibbles associated with the first and second groups of data channels, respectively, comprising:

a translation module capable of translating the information contained in the local exchange signaling channel into at least first and second internal signaling channels, wherein the first internal signaling channel receives the information contained in the first local exchange signaling nibble, and the second internal signaling channel receives the information contained in the second local exchange signaling nibble, and wherein each of the first and second internal signaling channels are capable of storing a greater amount of information than are each of the first and second local exchange signaling nibbles, respectively.

19. An information distribution system, comprising:

an optical fiber;

a subscriber interface unit; and an office interface unit, the optical fiber interconnecting the subscriber interface unit and the office interface unit, wherein the office interface unit is connected to a local exchange, the local exchange transmitting and receiving data and signaling information in a protocol which includes a plurality of channels contained in repetitive local exchange frames, each frame containing first and second groups of data channels and a local exchange signaling channel, the local exchange signaling channel containing at least first and second local exchange signaling nibbles associated with the first and second groups of data channels, respectively, the office interface unit comprising:

a translation module capable of translating the information contained in the local exchange signaling channel into at least first and second internal signaling channels, wherein the first internal signaling channel receives the information contained in the first local exchange signaling nibble, and the second internal signaling channel receives the information contained in the second local exchange signaling nibble; and a cross connect module capable of cross connecting individual data channels and their associated signaling information within the office interface unit.

20. A method for transferring data and signaling information between a telephone local exchange and distribution lines, the local exchange transmitting and receiving the data and signaling information in a protocol which includes a plurality of channels contained in repetitive local exchange frames, each frame containing first and second groups of data channels and a local exchange signaling channel, the local exchange signaling channel containing at least first and second local exchange signaling nibbles associated with the first and second groups of data channels, respectively, comprising the steps of:

providing an office interface unit including:

a translation module capable of translating the information contained in the local exchange signaling channel into at least first and second internal signaling channels, the first internal signaling channel receiving the information contained in the first local exchange signaling nibble, and the second internal signaling channel receiving the information contained in the second local exchange signaling nibble, and a cross connect module capable of cross connecting individual data channels and their associated signaling information within the office interface unit;

sizing the internal signaling channels so that their bit size exceeds the bit size of their associated local exchange signaling nibbles; and translating the local exchange signaling nibbles into the respective internal signaling channels, wherein each of the latter has at least twice as many signaling states as each of the former.

* * * * *

UNITED STATES PATENT AND TRADEMARK OFFICE
CERTIFICATE OF CORRECTION

PATENT NO. : 5,402,479
DATED : March 28, 1995
INVENTOR(S) : Ellersick et al

It is certified that error appears in the above-indentified patent and that said Letters Patent is hereby corrected as shown below:

Column 3, line 46 delete "means for".

Column 5, line 48 change "rum" to --turn--.

Column 8, line 25 change "mount" to --amount--.

Signed and Sealed this

Twenty-fifth Day of July, 1995

Attest:

BRUCE LEHMAN

Attesting Officer

Commissioner of Patents and Trademarks